US012664334B2

(12) United States Patent
Peng et al.

(10) Patent No.: US 12,664,334 B2
(45) Date of Patent: Jun. 23, 2026

(54) CONSTRUCTION METHOD, COLLISION SIMULATION METHOD, AND SYSTEM FOR SIMPLIFIED RAIL VEHICLE MODELS

(71) Applicant: CENTRAL SOUTH UNIVERSITY, Changsha (CN)

(72) Inventors: Yong Peng, Changsha (CN); Gongxun Deng, Changsha (CN); Guangjun Gao, Changsha (CN); Song Yao, Changsha (CN); Suchao Xie, Changsha (CN); Ping Xu, Changsha (CN); Shuguang Yao, Changsha (CN)

(73) Assignee: CENTRAL SOUTH UNIVERSITY, Changsha (CN)

( * ) Notice: Subject to any disclaimer, the term of this patent is extended or adjusted under 35 U.S.C. 154(b) by 0 days.

(21) Appl. No.: 19/006,304

(22) Filed: Dec. 31, 2024

(65) Prior Publication Data

US 2025/0131162 A1    Apr. 24, 2025

Related U.S. Application Data

(63) Continuation of application No. PCT/CN2023/082406, filed on Mar. 20, 2023.

(30) Foreign Application Priority Data

Jul. 8, 2022    (CN) .......................... 202210797795.8

(51) Int. Cl.
*G06F 30/23*        (2020.01)
*G06F 30/15*        (2020.01)
*G06F 119/14*       (2020.01)

(52) U.S. Cl.
CPC .............. *G06F 30/23* (2020.01); *G06F 30/15* (2020.01); *G06F 2119/14* (2020.01)

(58) Field of Classification Search
CPC ...... G06F 30/25; G06F 30/367; G06F 30/398; G06F 2111/00; G06F 2119/22; G06F 30/23; G06F 30/15; G06F 2119/14
See application file for complete search history.

(56) References Cited

U.S. PATENT DOCUMENTS 8,285,532 B2 * 10/2012 Zangl ...................... E21B 49/00
                                                              703/10
10,831,937 B2 * 11/2020 Glatfelter ................ G06T 19/00
(Continued)

OTHER PUBLICATIONS

C. Gehre, H. Gades, P. Wernike, "Objective Rating of Signals Using Test and Simulation Responses", pp. 1-8, (Year: 2009).*

(Continued)

*Primary Examiner* — Kibrom K Gebresilassie
(74) *Attorney, Agent, or Firm* — Hemisphere Law, PLLC

(57) ABSTRACT

The disclosure provides a construction method including steps of: constructing a detailed model and a simplified model of the rail vehicle using finite element method based on the three-dimensional structure of the rail vehicle; initially setting the simplified model in accordance with the detailed model, including specifying materials, mechanical properties parameters, and mass point; setting different simplification thickness ratio to obtain a plurality of sets of the simplified models, designing longitudinal and lateral collision conditions, and in each type of the collision conditions, performing collision simulations on the detailed model and each set of the simplified models under each thickness ratio to obtain respective collision response curves; calculating a total CORA value corresponding to the plurality of sets of the simplified models; selecting an optimal simplified model from n sets of the simplified models with the highest total CORA values.

20 Claims, 10 Drawing Sheets

Constructing a refined model and a simplified model of the rail vehicle using finite element method based on the three-dimensional structure of the rail vehicle — Step 1

Initially setting the simplified model in accordance with the refined model — Step 2

Setting different thickness simplification ratios to obtain a plurality of sets of the simplified models, and designing longitudinal and lateral collision conditions, and in each type of the collision conditions, performing collision simulations on the refined model and each set of the simplified models under each thickness simplification ratio to obtain respective collision response curves — Step 3

Using a CORA evaluation method to calculate a total CORA value corresponding to the plurality of sets of the simplified models that have different thickness simplification ratio, based on the collision response curves of the simplified model and the refined model in the same collision condition — Step 4

(56)  References Cited

U.S. PATENT DOCUMENTS

| | | | | |
|---|---|---|---|---|
| 2003/0115037 | A1* | 6/2003 | Sumida | G06F 30/367 |
| | | | | 703/22 |
| 2010/0201139 | A1* | 8/2010 | Hashimura | B60R 19/18 |
| | | | | 293/133 |
| 2014/0365184 | A1* | 12/2014 | Walker | G06F 30/23 |
| | | | | 703/2 |
| 2020/0377081 | A1* | 12/2020 | Wågström | B60R 21/013 |

OTHER PUBLICATIONS

Gongxun Deng, Yong Peng 1,*, Lin Hou, Zhixiang Li, Benhuai Li, Chao Yu and Ciaran Simms, "A Novel Simplified FE Rail Vehicle Model in Longitudinal and Lateral Collisions" pp. 1-20, Dec. 2022. (Year: 2022).*
CNIPA, Notification of First Office Action for CN202210797795.8, Jan. 3, 2023.
CNIPA, Notification to grant patent right for invention in CN202210797795.8, Mar. 1, 2023.

* cited by examiner

| | |
|---|---|
| Constructing a refined model and a simplified model of the rail vehicle using finite element method based on the three-dimensional structure of the rail vehicle | Step 1 |

| | |
|---|---|
| Initially setting the simplified model in accordance with the refined model | Step 2 |

| | |
|---|---|
| Setting different thickness simplification ratios to obtain a plurality of sets of the simplified models, and designing longitudinal and lateral collision conditions, and in each type of the collision conditions, performing collision simulations on the refined model and each set of the simplified models under each thickness simplification ratio to obtain respective collision response curves | Step 3 |

| | |
|---|---|
| Using a CORA evaluation method to calculate a total CORA value corresponding to the plurality of sets of the simplified models that have different thickness simplification ratio, based on the collision response curves of the simplified model and the refined model in the same collision condition | Step 4 |

FIG. 1

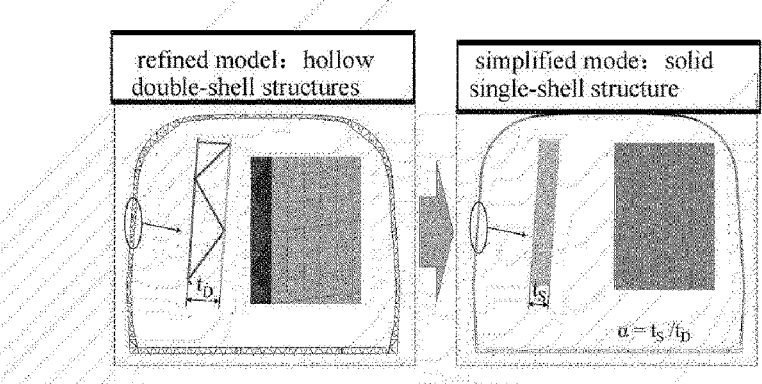

CONSTRUCTION METHOD, COLLISION SIMULATION METHOD, AND SYSTEM FOR SIMPLIFIED RAIL VEHICLE MODELS

This application is a Continuation of PCT Patent Application No. PCT/CN2023/082406 filed on Mar. 20, 2023, which claims priority of China Patent Application No. 2022107977958 filed on Jul. 8, 2022. The contents of the above-identified applications are incorporated herein by reference.

TECHNICAL FIELD

The disclosure relates to vehicle simulation technologies, in particular to a constructing method for a simplified rail vehicle model, a collision simulation method, and a system.

BACKGROUND

The occurrence of train collisions, derailments, and other accidents cannot be fully avoided, and due to the unrestrained state of passengers, they are highly vulnerable to severe injuries during train accidents. Thus, the passive safety of trains has become a key research focus and challenge in train safety protection. While full-scale crash tests are an effective means to study train crashworthiness, they involve significant costs in terms of manpower, material, and financial resources, as well as long timelines. Therefore, numerical simulations, particularly Finite Element (FE) simulations, have emerged as vital tools for investigating the dynamic response of train collisions. However, trains consist of multiple carriages, and the detailed train models encompass enormous numbers of element meshes and nodes, leading to low computational efficiency even on high-performance servers and high demands on hard disk storage space. Consequently, appropriately and effectively simplifying train simulation models to enhance simulation efficiency and reduce computational costs is crucial.

To address the issue of low computational efficiency in FE simulations of train collisions, researchers have made some attempts. For instance, Chinese Patent CN 103294860 B discloses "a Model Simplification Method for Multi-Carriage Train Collision Simulation in Railway Vehicles" which simplifies the undeformed middle sections of vehicles into one-dimensional (1D) beam elements and mass elements during longitudinal impacts. Another Chinese Patent, CN 109492346 B, reveals a "Construction Method for Simplified Models of Railway Train Collision Simulation", dividing the middle section of vehicles into multiple deformation segments, which are then simulated using various mass points and 1D beam elements for longitudinal impacts.

However, both patents focus solely on pure longitudinal collision scenarios, disregarding the multi-carriage configuration effect and complex operational environments of trains in real accidents. These accidents often involve both longitudinal and lateral impacts, such as one carriage hitting the side of another or collisions between train sides and railway infrastructure. Thus, the aforementioned technologies are inadequate for analyzing the collision dynamics response in complex train accident scenarios and fail to accurately simulate actual collision conditions. Additionally, as the middle sections of the car bodies are entirely replaced with mass points and 1D beam elements in these solutions, they cannot replicate the actual interior scenarios of trains, limiting their applicability in studying secondary impact injuries to train occupants.

In summary, existing simplification methods for FE simulation models of train collisions possess certain limitations and require further improvements.

SUMMARY

To address the technical issues in existing technologies, such as the lack of consideration for lateral impacts, the inapplicability to complex train accident scenarios for crash dynamics response analysis, and the inability to study secondary collision injuries of railway vehicle occupants, the disclosure provides a method and system for constructing a simplified railway vehicle model, as well as a collision simulation method. In The disclosure, the simplified model, firstly, does not replace the middle section of the car body with mass points and one-dimensional beam elements but instead uses a solid single-shell structure, preserving the exterior shape of the car body. This ensures that subsequent simulations for side collisions/lateral collisions can be performed, demonstrating the model's adaptability to collision studies in complex train accident scenarios. Secondly, by retaining the exterior shape, the interior fittings of the car body are also preserved, allowing direct placement of dummy models within the simplified model for simulating secondary collisions of train occupants. Thirdly, the construction process of the simplified model in the disclosure considers both longitudinal and lateral collision conditions, making the CORA (correlation and analysis) objective rating value of each simplified model more representative, practical, and aligned with actual operating conditions, ultimately resulting in a simplified model that better meets the needs of the field. Fourthly, the thickness ratio configured to adjust the simplified model takes into account the varying double-shell thickness spacings in different parts of the actual railway vehicle body (e.g., roof, floor, side walls). This ratio is defined as the ratio of the solid single-shell thickness of the simplified model to the thickness spacing of the hollow double-shell of the detailed model. A single thickness ratio is applied to the entire railway vehicle, and different shell element thicknesses are assigned to different parts of the car body (e.g., roof, side walls), enabling proportional scaling of shell elements based on the same thickness ratio, thus simplifying the design process.

On one hand, the disclosure provides a method for constructing a simplified railway vehicle model, the method includes the following steps of: step 1: constructing a detailed model and a simplified model of the rail vehicle using finite element method based on the three-dimensional structure of the rail vehicle, wherein in the simplified model, a middle part of the carriage body is configured as a solid single-shell structure, while the two ends of the carriage body are configured as a hollow double-shell structure; step 2: initially setting the simplified model in accordance with the detailed model, including specifying materials, mechanical properties parameters, and mass points; step 3: setting different simplification thickness ratio to obtain a plurality of sets of the simplified models, designing longitudinal and lateral collision conditions, and in each type of the collision conditions, performing collision simulations on the detailed model and each set of the simplified models under each thickness ratio to obtain respective collision response curves, wherein the thickness ratio is a ratio of the thickness of the solid single-shell of the simplified model to a thickness spacing of the hollow double-shell of the detailed model at the same position; step 4: using a CORA evaluation method to calculate a total CORA value corresponding to the plurality of sets of the simplified models that have different thickness ratio, based on the collision response curves of the simplified model and the detailed model in the same collision condition, the step 4 including steps of: calculating CORA values for all the simplified model under the same collision condition based on the collision response curves of the detailed model and the plurality of sets of simplified models under the same collision condition; and performing weighted calculations on the CORA values under all collision conditions to obtain the total CORA value; and step 5, selecting an optimal simplified model from n sets of the simplified models with the highest total CORA values, where a value range of n is 2 to 5.

Further, when there are common nodes, mesh elements positioned between both ends of the hollow double-shell structure and a central section of the solid single-shell structure are connected through the common nodes; when there are no common nodes, free ends of the hollow double-shell structure are connected to the solid single-shell structure through rigid beam elements.

Further, the collision response curves further include one or more of a collision kinetic energy-time curve, an internal energy-time curve, and an acceleration-time curve.

Further, for one type of collision response curve, the CORA value for the simplified model, under any of the simplification thickness ratio in any of the collision conditions, is calculated according to the following:

$$C = w_1 C_1 + w_2 * C_2$$

$$C_2 = w_{2a} * C_{2a} + w_{2b} * C_{2b} + w_{2c} * C_{2c}$$

In the formula, C indicates the CORA value; $w_1$, $w_2$, $w_{2a}$, $w_{2b}$, and $w_{2c}$ are all weighting factors, where the sum of $w_1$ and $w_2$ equals 1, and the sum of $w_{2a}$, $w_{2b}$, and $w_{2c}$ also equals 1; $C_1$ indicates a channel correlation score, $C_2$ indicates a cross-correlation score, $C_{2a}$ indicates a phase difference score, $C_{2b}$ indicates a peak difference score, and $C_{2c}$ indicates a slope difference score.

Further, wherein operations of obtaining the channel correlation score $C_1$ comprise: generating an inner channel and an outer channel based on the collision response curves of the detailed model; calculating the channel correlation score $C_1$ based on a positional relationship between the collision response curves of the simplified model and the two signal channels, wherein when the collision response curve of the simplified model is within a boundary of the inner channel, the channel correlation score $C_1$ is 1; when the collision response curve of the simplified model is outside an outer boundary of the outer channel, the channel correlation score $C_1$ is 0; when the collision response curve of the simplified model is between the inner and outer channels, the channel correlation score $C_1$ is calculated according to the following formula:

$$C_i = \begin{cases} 1 & , \text{when } |y(t_i) - x(t_i)| < \delta_i(t) \\ \left( \dfrac{\delta_0(t) - |y(t_i) - x(t_i)|}{\delta_0(t) - \delta_i(t)} \right)^k & \\ 0 & , \text{when } |y(t_i) - x(t_i)| > \delta_i(t) \end{cases}$$

Wherein, k>0 and k∈N $$C_1 = \frac{\sum_{i=1}^{n} C_i}{n},$$

$$0 \le C_1 \le 1$$

Where $\delta_0(t)$ is the lower/upper bounds of the outer corridor at time t; $\delta_i(t)$ is the lower/upper bounds of the inner corridor at time t; $y(t_i)$ is the reference signal (i.e., the responses of the detailed FE model); $x(t_i)$ is the evaluation signal (i.e., the responses of the simplified FE model); $c_i$ is the rating score at different time; i is the ith time step; k is the exponent factor for calculating the corridor score between the inner and outer corridors; and N is all natural numbers without zero.

Further, operations of obtaining the cross-correlation score $C_2$ includes: within the evaluation interval $[t_{min}, t_{max}]$, the reference curve is shifted by changing multiples of the time step $\Delta t$, and a cross-correlation value between the reference curve and the evaluation curve is calculated for each changed time step $\Delta t$; the reference curve is the collision response curve of the detailed model, and the evaluation curve is the collision response curve of the simplified model; at a time step of maximum cross-correlation, the phase difference score $C_{2a}$, the slope difference score $C_{2c}$, and the peak difference score $C_{2b}$ between the reference curve and the evaluation curve are calculated.

Further, operations of selecting the optimal simplified model in step 5 includes: based on the total CORA value of the simplified models with different simplification thickness ratio, selecting the simplified model with the highest similarity in collision deformation mode to the detailed model from the n simplified models with the highest total CORA values as the optimal simplified model.

In a second aspect, the disclosure provides a method for simulating occupant secondary collisions based on a simplified railway vehicle model, which includes steps of: S1: constructing a simplified model of the target railway vehicle according to the method for constructing a simplified rail vehicle model; S2: using the simplified model to simulate the actual interior decoration and occupant scenarios within a target railway vehicle, and performing collision simulations to obtain collision simulation results.

In a third aspect, the disclosure provides a terminal device, includes a memory, and a processor. The memory is configured to store program instructions; the processor is configured to performed the program instructions to perform a method for constructing a simplified rail vehicle model, the method for constructing the simplified rail vehicle model.

Advantageous Effects

1. Compared to the detailed model, the simplified model provided by the disclosure effectively reduces the number of mesh elements and nodes, enhances simulation efficiency, and decreases computational complexity. Specifically, the original hollow double-shell structure in the middle section of the vehicle body is modified into a solid single-shell structure, while preserving the vehicle's external shape. This ensures the subsequent feasibility of lateral impact tests, i.e., collisions between the side of the vehicle body and obstacles. In contrast to existing arts that directly remove the middle section of the vehicle body and replace it with structural beams and mass points results in the absence of an exterior shape for the middle section of the vehicle body, the technical solution of the disclosure better aligns with actual needs in the skill art, providing a more realistic recreation of actual collision conditions. Moreover, by retaining the vehicle's external shape, interior furnishings can also be preserved, allowing for the placement of dummy models inside the vehicle for secondary collision simulations of train occupants. Thus, the simplified model offered by the technical solution of the disclosure, while ensuring similar collision results to the detailed model, also enables secondary collision simulations of occupants, broadening its application scope.

2. To ensure that the collision performance of the simplified model closely matches that of the detailed model, the disclosure's technical solution introduces the CORA (Correlation and Analysis) evaluation method for the first time into the construction of simplified models in this field. Different from previous evaluation methods, CORA combines two independent sub-methods: a channel correlation score and a cross-correlation score, which complement each other, with one compensating for the shortcomings of the other. The channel correlation score assesses the degree of fit between the response curve and the channel, while the cross-correlation method evaluates the phase, slope, and peaks under the curve. By incorporating CORA into the construction of the simplified model, the disclosure's technical solution brings the collision performance of the constructed simplified model closer to that of the detailed model.

3. The technical solution of the disclosure simultaneously considers both longitudinal and lateral collision conditions, meaning that the CORA score for each simplified model is derived based on both longitudinal and lateral collision response curves. This approach ensures that the constructed simplified model better reflects actual operating conditions.

4. In adjusting the simplified model using simplification thickness ratio, the technical solution of the disclosure takes into account the varying double-shell thickness spacings of different parts (such as the roof, floor, and sidewalls) of actual railway vehicle bodies. The simplification thickness ratio is defined as the ratios of the solid single-shell thickness of the simplified models to the thickness spacing of the hollow double-shell of the detailed model. With one thickness ratio corresponding to the entire railway vehicle, different shell element thicknesses are assigned to different parts of the vehicle body in the middle (e.g., roof, sidewalls), allowing for the scaling of shell elements proportionally based on the same thickness ratio. This simplifies the design process.

BRIEF DESCRIPTION OF THE DRAWINGS

FIG. 1 is a flowchart illustrating the method for constructing a simplified railway vehicle model.

FIG. 2 is a schematic diagram demonstrating the simplification process of a railway vehicle body's cross-section.

DETAILED DESCRIPTION OF THE EMBODIMENTS

The disclosure provides a method and system for constructing a simplified railway vehicle model, adopting a novel technical approach to create the simplified model. Compared to a detailed model, it reduces the number of meshes/nodes while ensuring similar collision performance, thereby enhancing simulation efficiency and lowering computational complexity. Furthermore, the proposed simplified model retains the vehicle's external shape, enabling simulations of lateral impacts and secondary occupant collisions. The following provides further elaboration on the invention through embodiments.

Embodiment 1

This embodiment provides a method for constructing a simplified railway vehicle model, including the following steps:

Step 1: constructing a detailed model and a simplified model of the rail vehicle using finite element method based on the three-dimensional (3D) structure of the rail vehicle.

In detail, in the step 1, first, a detailed model of the railway vehicle is constructed using finite element (FE) method based on a precise 3D model. The validity of the detailed model (detailed FE model) is verified by performing collision simulation tests on structural components or a full-vehicle. The detailed FE model referred to in this embodiment is a one-to-one representation of the vehicle's structure. Since the construction and validation of the detailed model are conventional technologies in the skill art, specific details are omitted here.

Figure 3:
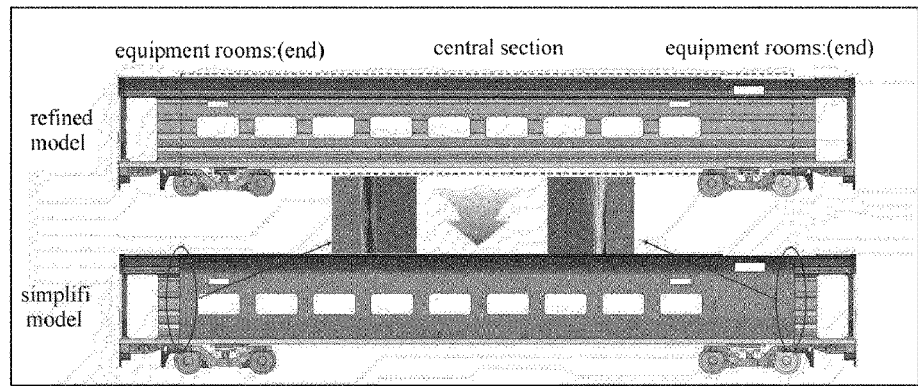
FIG. 3 is another schematic diagram showing the simplification process of a railway vehicle body's cross-section.

As shown in FIG. 2, the simplified model modifies the sandwich corrugated hollow double-shell structure in the middle section of a vehicle body of the simplified model to a solid single-shell structure, still simulated using shell elements. The ends of the body remain as an original sandwich corrugated hollow double-shell structure (as shown in FIGS. 2 and 3), while other areas remain unchanged, such as bogies, which are consistent with their counterparts in the detailed model. As shown in FIG. 3, in this embodiment, an intermediate car is taken as an example, though the method applies to head cars, intermediate cars, or entire trains, the middle section of any car body generally refers to the passenger area, while ends of intermediate cars are typically equipment rooms, and the ends of the head cars are the driver's cab and an opposite equipment room. It should be understood that the simplified model constructed in this manner retains the vehicle's external shape, laying the foundation for subsequent lateral impact and secondary occupant collision simulations.

Step 2: initially setting the simplified model in accordance with the detailed model, including specifying materials, mechanical properties parameters, and mass points.

The goal of the step 2 is to ensure that the simplified model's materials, mechanical properties, total mass, center of gravity height, moment of inertia, and other parameters are consistent or close to those of the detailed model.

Figure 4:
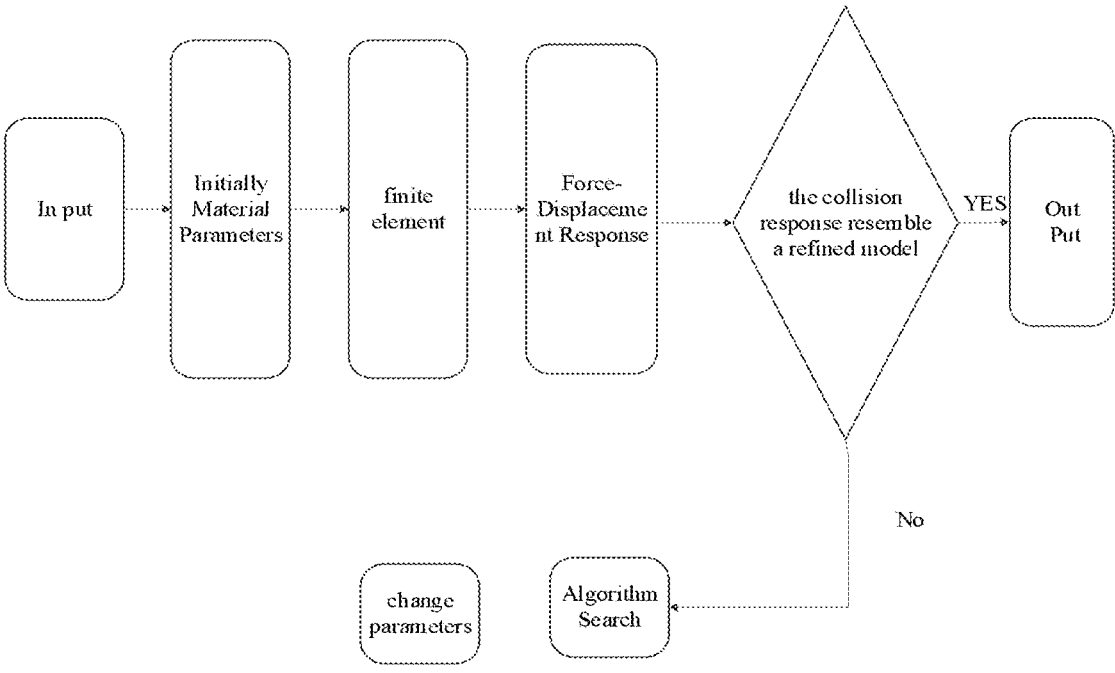
FIG. 4 is a diagram illustrating the acquisition of material mechanical parameters for the anisotropic constitutive model of the simplified model.

For materials and mechanical properties, define the material constitutive model and mechanical properties for the simplified sections of the simplified model, setting them as anisotropic constitutive models or adopting those from the detailed model. The anisotropic constitutive model is a conventional model in this field, as shown in FIG. 4. The final criterion is to adjust the simplified model's material parameters to achieve similar collision responses compared to the detailed model. Since this content is prior art, specific details are omitted.

For mass points, distribute zero-dimensional (0D) mass points with varying masses at different locations of the simplified model to ensure that its total mass, center of gravity height, moment of inertia, and other parameters match those of the detailed model. As this step also utilizes common FE modeling method, and specific details are omitted.

Step 3: setting different simplification thickness ratio to obtain a plurality of sets of the simplified models, designing longitudinal and lateral collision conditions, and in each type of the collision conditions, performing collision simulations on the detailed model and each set of the simplified models under each thickness ratio to obtain respective collision response curves.

Since the double-shell thickness spacings vary among different parts of an actual railway vehicle body (e.g., roof, floor, sidewalls), the thickness ratio ($\alpha$) of the simplified model is defined as the ratio of the thickness ($t_S$) of the single-shell structure in the simplified model to the thickness spacing ($t_D$) of the double-shell structure in the detailed model (as shown in FIG. 2), i.e., $\alpha = t_S/t_D$. The same simplified model corresponds to one single $\alpha$ value, defining the shell element thickness for the simplified middle section of the railway vehicle model. Different shell element thicknesses are assigned to different body parts (e.g., roof, sidewalls) to ensure a consistent a value across the same simplified model, allowing for proportional scaling of shell thicknesses across different body parts. The $\alpha$ value is empirically determined, ranging from 0.2 to 0.6 in this embodiment, but generally can be set around 0.2 to 0.8.

Figure 5:
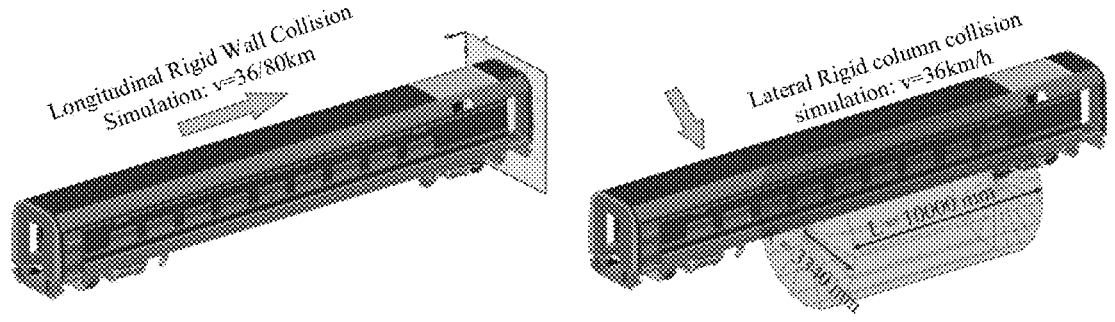
FIG. 5 is a schematic diagram depicting the collision simulation conditions for a railway vehicle.

A plurality of sets of simplification thickness ratio are configured within the 0.2 to 0.6 range in this embodiment. Different longitudinal and lateral collision simulation scenarios for railway vehicles are also designed to compare and analyze the collision response differences between the detailed model and the plurality of sets of the simplified models with different simplification thickness ratio under the same conditions. Based on existing train crashworthiness standards, this embodiment designs simulations for 36 km/h and 80 km/h longitudinal rigid wall collisions and 36 km/h lateral rigid pole collisions (as shown in FIG. 5).

The collision response curves selected in this embodiment are compression-time curves and impact force-time curves. In other embodiments, collision kinetic energy-time curves, internal energy-time curves, or acceleration-time curves can also be included.

Step 4: using a CORA evaluation method to calculate a total CORA value corresponding to the plurality of sets of the simplified models that have different thickness ratio, based on the collision response curves of the simplified model and the detailed model in the same collision condition.

Figure 6:
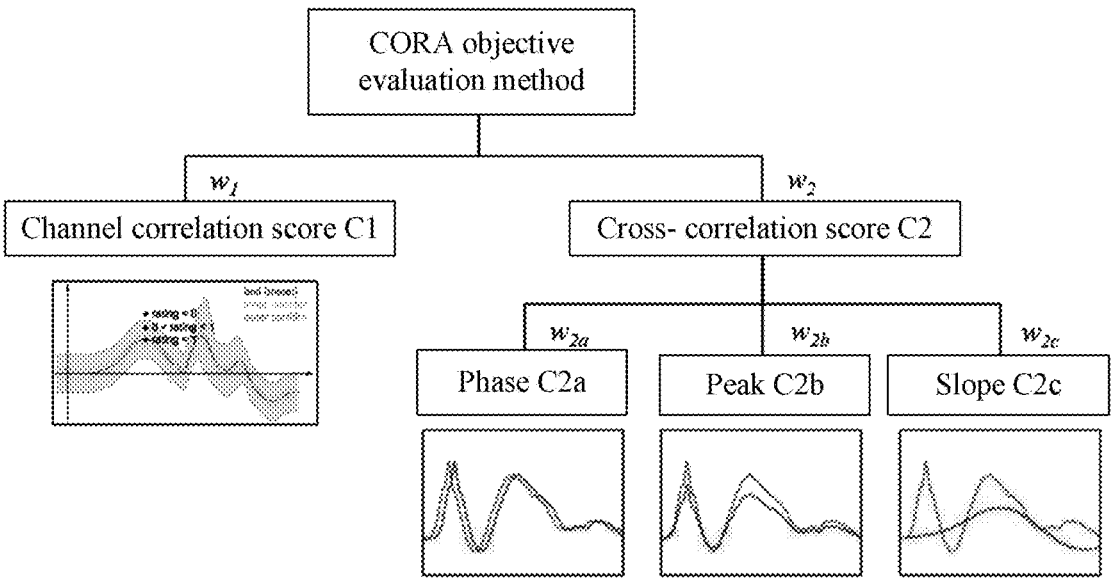
FIG. 6 is a diagram representing the CORA (Correlation and Analysis) objective evaluation method.

The disclosure employs the CORA objective rating method to quantitatively assess the fit between the collision responses of the simplified and detailed models with different simplification thickness ratio. The CORA method differs from previous methods by combining two independent sub-methods: a channel correlation score and a cross-correlation score. The channel correlation score method assesses the fit between the response curve and the channel, while the cross-correlation method evaluates phase, slope, and peaks under the curve. Both sub-methods are essential as each compensates for the other's shortcomings. FIG. 6 illustrates the principal structure of the CORA scoring scheme.

For a type collision response curve, the CORA value of a simplified model with a specific simplification thickness ratio under any of the collision conditions is calculated using the following formula:

$$C = w_1 C_1 + w_2 * C_2 \tag{1}$$

$$C_2 = w_{2a} * C_{2a} + w_{2b} * C_{2b} + w_{2c} * C_{2c} \tag{2}$$

$$1 = \sum w_i \tag{3}$$

In the formula, in the formula, C indicates the CORA value; $w_1$, $w_2$, $w_{2a}$, $w_{2b}$, and $w_{2c}$ are all weighting factors, where the sum of $w_1$ and $w_2$ equals 1, and the sum of $w_{2a}$, $w_{2b}$, and $w_{2c}$ also equals 1; $C_1$ indicates a channel correlation score, $C_2$ indicates a cross-correlation score, $C_{2a}$ indicates a phase difference score, $C_{2b}$ indicates a peak difference score, and $C_{2c}$ indicates a slope difference score. The final score results C (the CORA value) ranges from "0" (no correlation) to "100%" (perfect match). Additionally, users can customize these weighting factors to adjust the scoring method for more reliable evaluation results.

The channel correlation score, $C_1$, is typically calculated by measuring the deviation between two curves based on user-defined or automatically generated signal channels (in this embodiment, automatically generated channels are adopted). Specifically, in this embodiment, first calculates the channel curves of the reference signal (i.e., the collision response curve of the detailed model of rail vehicles in The disclosure) by automatically generating two channels from the existing reference curve. This can be understood as defining two channels along the reference curve, resulting in four curves: two internal and two external channels, as shown in FIG. 6, where one channel is defined by two curves outlining its upper and lower boundaries. Then, the channel correlation score, $C_1$, is calculated based on a positional relationship between the collision response curve of the simplified model and these two signal channels.

If the evaluation curve (i.e., the collision response curve of the simplified model of rail vehicles in the disclosure) lies within the boundaries of an internal channel, $C_1$ is assigned a score of "1". If the evaluation curve falls outside the boundaries of an external channel, $C_1$ is assigned a score of "0". When the evaluation curve is between the internal and external channels, $C_1$ is calculated using formula (4). The final channel correlation score, $C_1$, is the average of $C_i$ calculated at each time step within the evaluation interval $[t_{min}, t_{max}]$, as shown in formula (5).

$$C_i = \begin{cases} 1 & , \text{when} |y(t_1) - x(t_i)| < \delta_i(t) \tag{4} \\ \left( \dfrac{\delta_0(t) - |y(t_i) - x(t_i)|}{\delta_0(t) - \delta_i(t)} \right)^k & \\ 0 & , \text{when} |y(t_i) - x(t_i)| > \delta_i(t) \end{cases}$$

$$\text{wherein, } k > 0 \text{ and } k \in N$$

$$C_1 = \frac{\sum_{i=1}^{n} c_i}{n}, \ 0 \le C_1 \le 1 \tag{5}$$

wherein, $\delta_0(t)$ indicates the boundary of the outer channel, $\delta_i(t)$ indicates the boundary of the inner channel, $y(t_i)$ indicates a reference curve, which is the collision response curve of the detailed model; $x(t_i)$ indicates an evaluation curve, which is the collision response curve of the simplified model; $C_i$ indicates the score at different time steps, where i indicates the ith time step, k is the exponential factor for the channel correlation score. For example, if the time range of the evaluation curve is [0, 100], calculations are performed every 5 seconds. k is the exponential factor for the channel correlation score, and N indicates a real number.

The cross-correlation score ($C_2$) of the curves comprehensively calculates the similarity of local features between the two curves by considering the phase difference score $C_{2a}$, peak difference score $C_{2b}$, and slope difference score $C_{2c}$. Specifically, the cross-correlation score first shifts the reference curve within the evaluation interval $[t_{min}, t_{max}]$ by changing multiples of the time step $\Delta t$. For each shifted time step, the cross-correlation value between the two curves is calculated. At the time step with the maximum cross-correlation, the phase difference score $C_{2a}$, peak difference score $C_{2b}$, and slope difference score $C_{2c}$ are calculated. The weighted sum of these three values yields the total cross-correlation score.

Firstly, the reference curve is shifted within the evaluation interval $[t_{min}, t_{max}]$ by changing multiples of the time step $\Delta t$, and a cross-correlation value between the reference curve and the evaluation curve is calculated for each shifted time step. The calculation formula is as follows:

$$K_{xy}(m) = \tag{6}$$

$$\frac{\sum_{i=0}^{n-1} x(t_{min} + (m+i) \cdot \Delta t) \cdot y(t_{min} + i \cdot \Delta t)}{\sqrt{\sum_{i=0}^{n-1} x^2(t_{min} + (m+i) \cdot \Delta t) \cdot \sum_{i=0}^{n-1} y^2(t_{min} + i \cdot \Delta t)}} \quad -1 \le K_{xy} \le 1$$

Wherein, $K_{xy}(m)$ indicates the cross-correlation score, $t_{min}$ is the minimum value of the evaluation interval, x indicates the evaluation curve, which is the collision response curve of the simplified model; y indicates the reference curve, which is the collision response curve of the detailed model. When m=0, 1, −1, 2, −2, . . . , the reference curve is shifted by m*$\Delta t$ time steps. The range of m is determined by user input parameters, and n is the total number of time steps in the evaluation interval.

Then, at the time step with the maximum cross-correlation, the phase difference score $C_{2a}$, slope difference score $C_{2c}$, and peak difference score $C_{2b}$ between the reference curve and the evaluation curve are calculated.

Among them, the shape rating (slope correlation score $C_{2c}$) is derived from the maximum cross-correlation score value K, and the formula is as follows:

$$C_{2c} = \left( \frac{1}{2}(K+1) \right)^{k_y} \quad k_y \in N > 0 \text{且} 0 \le C_{2c} \le 1 \tag{7}$$

Wherein, K is the exponential factor for the slope correlation score.

The Phase Shift Rating ($C_{2a}$) is controlled by the parameters $D_{min}$ and $D_{max}$, and is calculated as follows at the maximum cross-correlation score value K and the corresponding time shift g:

$$\delta_{min} = D_{min} \cdot (t_{max} - t_{min}) \quad 0 \le D_{min} \le 1 \tag{8}$$

$$\delta_{max} = D_{max} \cdot (t_{max} - t_{min}) \quad 0 \le D_{max} \le 1 \tag{9}$$

-continued $$C_{2a} = \begin{cases} 1, & \text{when}|\delta| < \delta_{min} \\ \left(\dfrac{|\delta_{max} - |\delta||}{\delta_{max} - \delta_{min}}\right)^{k_p} & k_G \in N > 0 \\ 0, & \text{when}|\delta| > \delta_{max} \end{cases} \quad (10)$$

Wherein, $D_{max}$ indicates the maximum percentage of time shift, $D_{min}$ indicates the minimum percentage of time shift, $g_{max}$ indicates the maximum value of time shift, $g_{min}$ indicates the minimum value of time shift, indicates the absolute value of time shift, and $K_p$ is the exponential factor for the Phase Shift Rating ($C_{2a}$).

The Size Rating ($C_{2b}$) evaluates the peak correlation level by comparing the areas enclosed by the two curves and the time axis. The formula is as follows:

$$F_x[t_{min} + \delta, t_{max} + \delta], \ F_y[t_{min}, t_{max}] \quad (11)$$

$$\frac{F_x}{F_y} = \frac{\sum_{i=0}^{n} x^2(t_{min} + i \cdot \Delta t)}{\sum_{i=1}^{n} y^2(t_{min} + \delta + i \cdot \Delta t)} \quad$$

$$C_{2b} = \begin{cases} \left(\dfrac{F_x}{F_y}\right)^{k_G}, & F_y > F_x \\ \left(\dfrac{F_x}{F_y}\right)^{k_G} & k_G \in N > 0 \end{cases} \quad (12)$$

Wherein, $F_x$ and $F_y$ are the mean square values of the evaluation curve x and the reference curve y, respectively, and $K_G$ is the exponential factor for the size rating ($C_{2b}$).

Based on the above formulas, the CORA value for any type of collision response curves, any of the simplified models with a specific thickness reduction ratio, and under any of the collision conditions can be calculated. Then, the weighted average of the CORA values for each thickness reduction ratio under a single collision condition for each type of collision response curve is calculated to obtain the CORA value for that thickness reduction ratio under that specific collision condition. Finally, different weights are assigned to different collision conditions for weighted calculation, yielding the total CORA value for each simplified rail vehicle model with a specific thickness reduction ratio.

Figure 7:
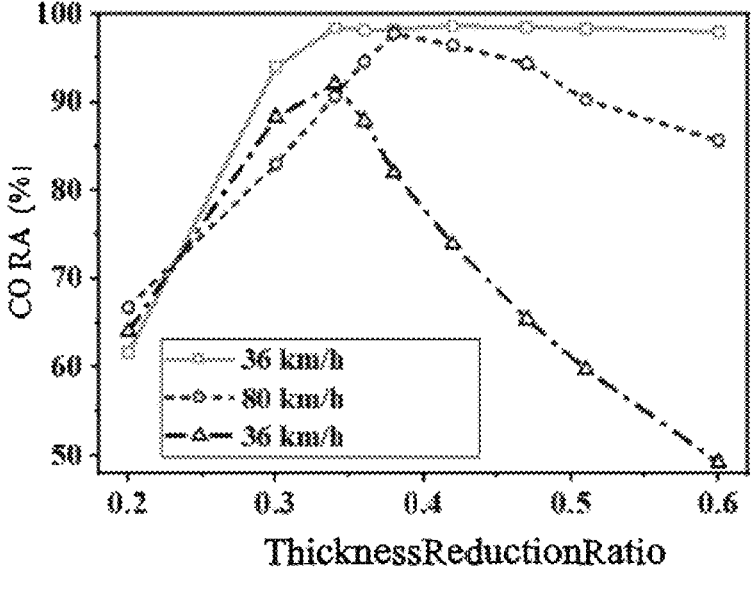
FIG. 7 is a graph plotting the average CORA curves of simplified models with various simplification thickness ratio under all collision simulation conditions.
Figure 8:
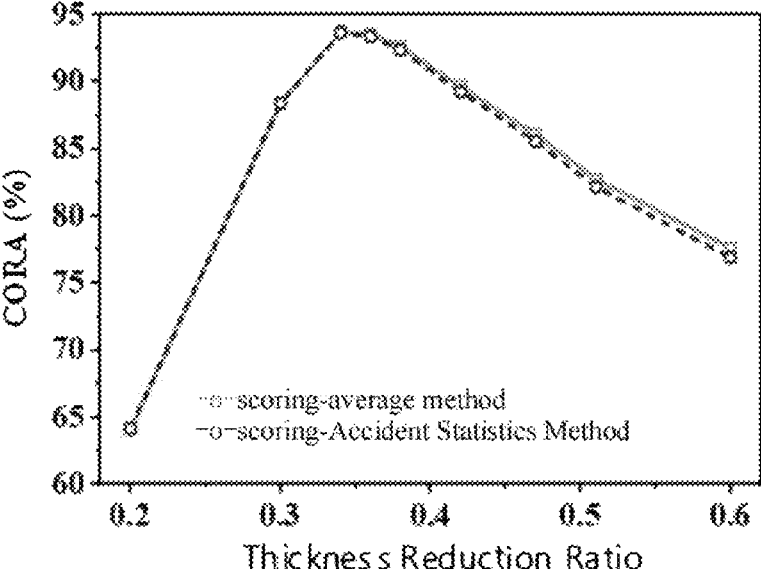
FIG. 8 is a graph displaying the overall CORA curves of simplified models with different simplification thickness ratio, calculated using various weights.
Figure 9:
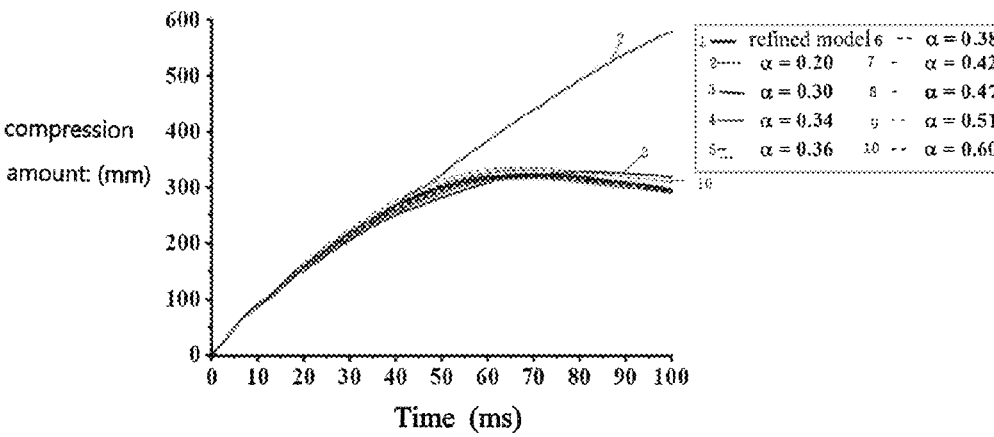
FIG. 9 is a comparison chart of the compression curves between the detailed model and simplified models with various simplification thickness ratio in a 36 km/h longitudinal rigid wall collision simulation, where some curves overlap significantly.
Figure 10:
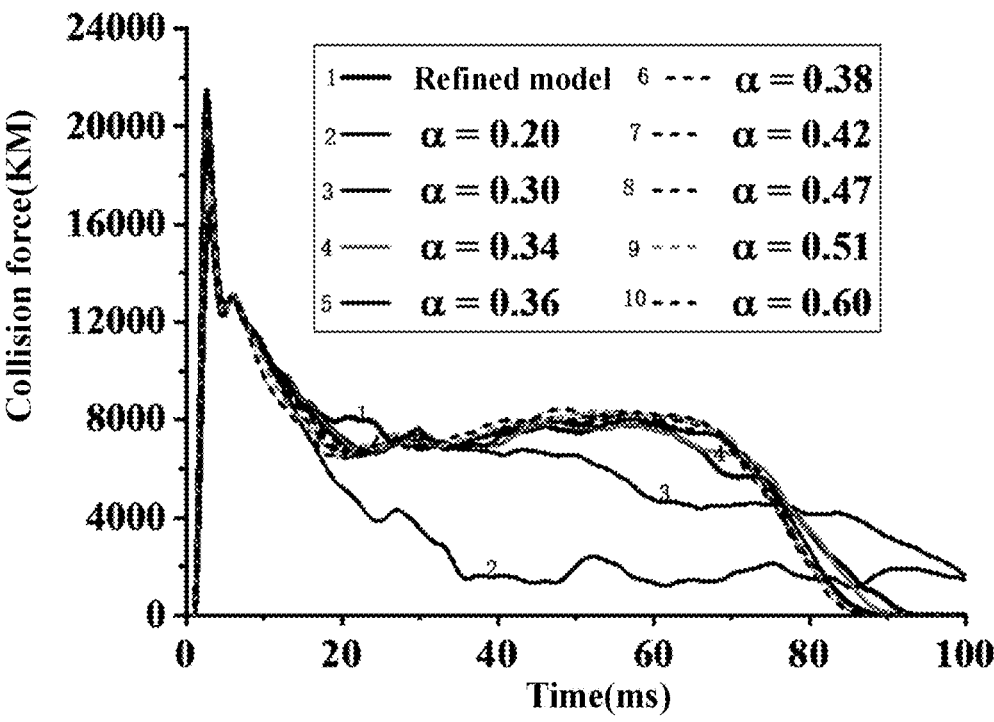
FIG. 10 is a comparison chart of the impact force curves between the detailed model and simplified models with various simplification thickness ratio in a 36 km/h longitudinal rigid wall collision simulation, with notable overlapping areas among some curves.
Figure 11:
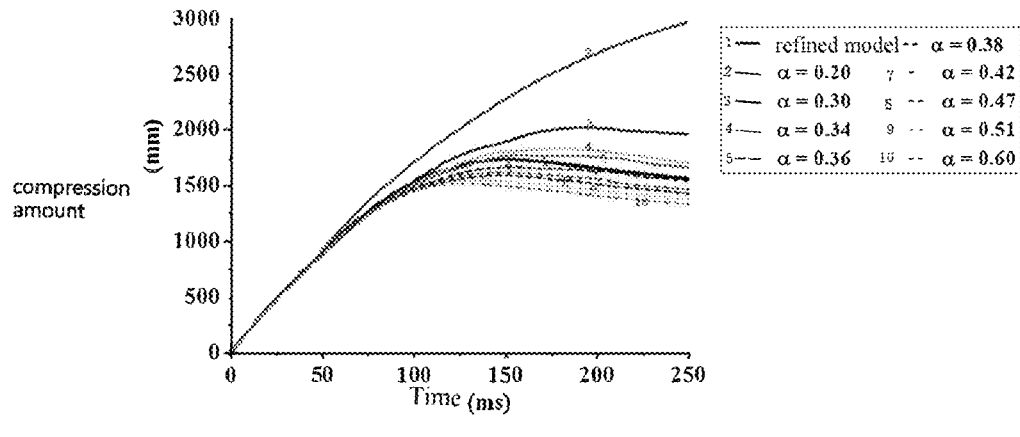
FIG. 11 is a comparison chart of the compression curves between the detailed model and simplified models with various simplification thickness ratio in an 80 km/h longitudinal rigid wall collision simulation.
Figure 12:
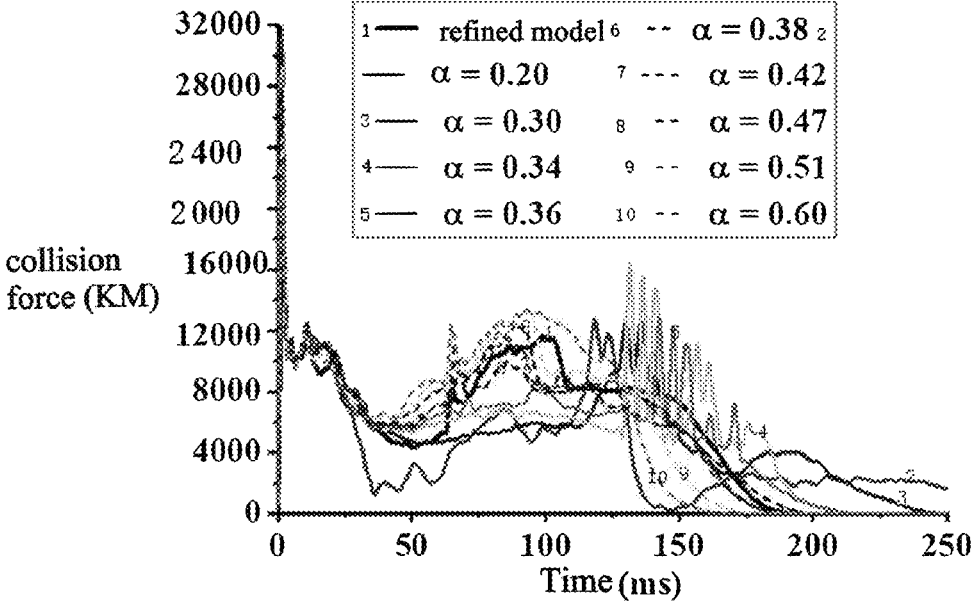
FIG. 12 is a comparison chart of the impact force curves between the detailed model and simplified models with various simplification thickness ratio in an 80 km/h longitudinal rigid wall collision simulation.
Figure 13:
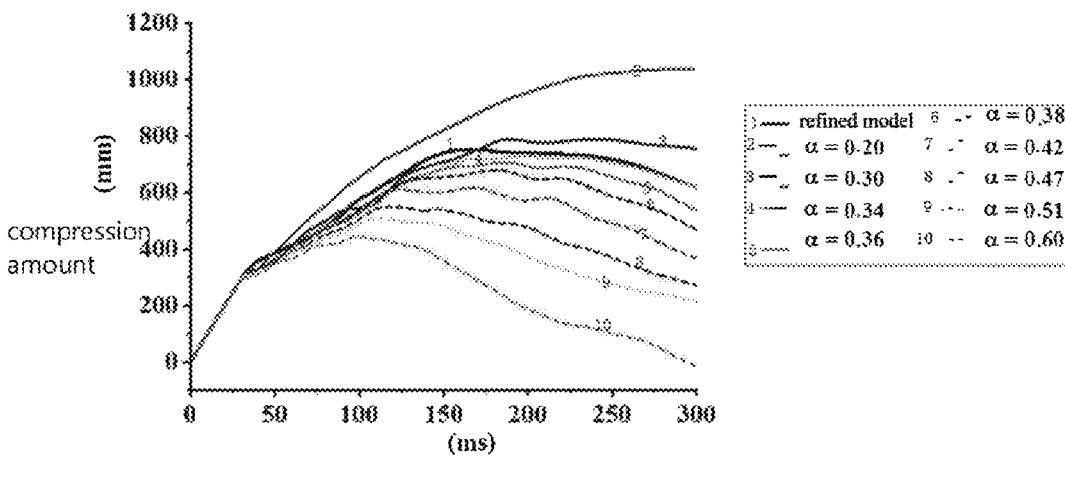
FIG. 13 is a comparison chart of the compression curves between the detailed model and simplified models with various simplification thickness ratio in a 36 km/h lateral rigid pole collision simulation.
Figure 14:
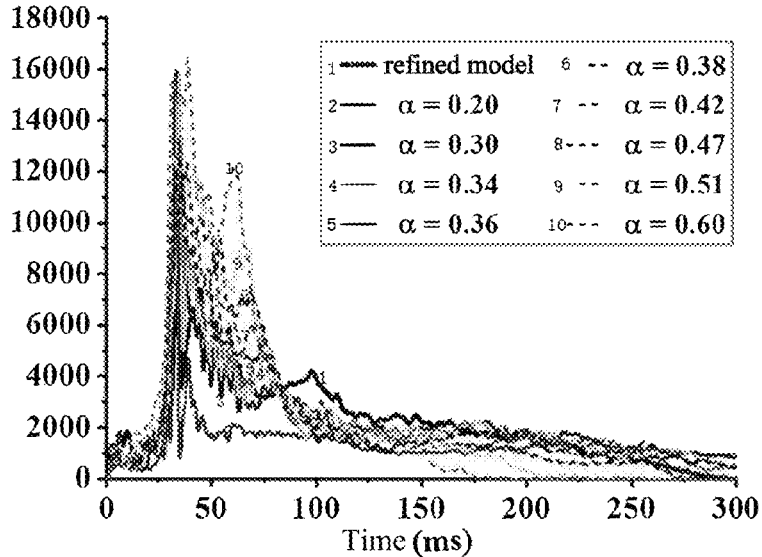
FIG. 14 is a comparison chart of the impact force curves between the detailed model and simplified models with various simplification thickness ratio in a 36 km/h lateral rigid pole collision simulation.

Specifically, in this embodiment, firstly, the CORA values for the compression signal and collision force signal of the simplified rail vehicle models with each thickness reduction ratio under all collision conditions are calculated. Then, the weighted average of the CORA values for both the compression signal and collision force signal is taken to obtain the average CORA value for each thickness reduction ratio under all collision conditions (as shown in FIG. 7). Subsequently, different weights are assigned to different collision conditions to calculate the total CORA value for each simplified rail vehicle model with a specific thickness reduction ratio (as shown in FIG. 8). The calculation weights for different collision conditions can be directly weighted averages or obtained through statistical data analysis. This embodiment utilizes both the weighted average method and accident data statistics method to calculate the total CORA value. Specifically, in the weighted average method, the weights for the three collision conditions are all ⅓. In the accident data statistics method, the ratio of the number of derailed/overturned carriages to the total number of carriages in complex train accidents such as collisions, derailments, and overturns is investigated and used as the weight for the 36 km/h lateral rigid pole collision simulation, while the weights for the 36 km/h longitudinal rigid wall collision simulation and the 80 km/h longitudinal rigid wall collision simulation are the same. In other embodiments, the weights can be adaptively adjusted based on precision requirements.

Step 5: selecting an optimal simplified model from n sets of the simplified models with the highest total CORA values. In this embodiment, the final collision deformation patterns of the n groups of simplified rail vehicle models with the highest total CORA values and the corresponding thickness reduction ratios are analyzed and compared with the detailed rail vehicle collision deformation pattern. Visual inspection is configured to determine which deformation pattern is closer to or has the highest similarity with the detailed model's results, thereby identifying the final simplified model. Alternatively, existing similarity calculation methods for representing collision deformations in the skill art can be configured to automatically determine the simplified model with the highest similarity. It should be understood that selecting a simplified model based solely on its total CORA value can already meet basic requirements, but this disclosure preferably further incorporates a comparison of deformation results to further ensure consistency or proximity between the simplified and detailed models.

Figure 15:
FIG. 15 is a comparison diagram of vehicle deformation modes between the detailed model and the optimal simplified model in a 36 km/h longitudinal rigid wall collision simulation.
Figure 16:
FIG. 16 is a comparison diagram of vehicle deformation modes between the detailed model and the optimal simplified model in an 80 km/h longitudinal rigid wall collision simulation.
Figure 17:
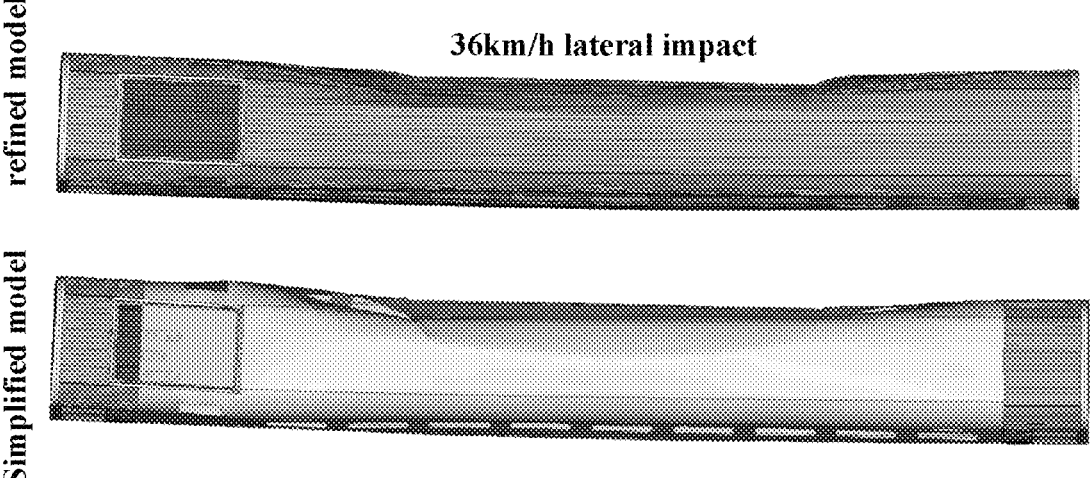
FIG. 17 is a comparison diagram of vehicle deformation modes between the detailed model and the optimal simplified model in a 36 km/h lateral rigid pole collision simulation.
Figure 18:
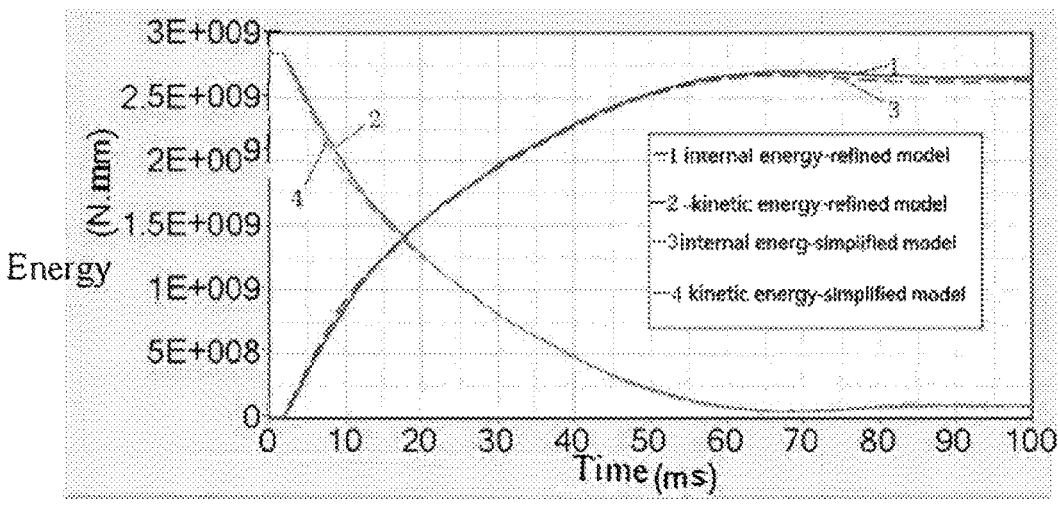
FIG. 18 is a comparison chart of collision energy curves between the detailed model and the optimal simplified model in a 36 km/h longitudinal rigid wall collision simulation.
Figure 19:
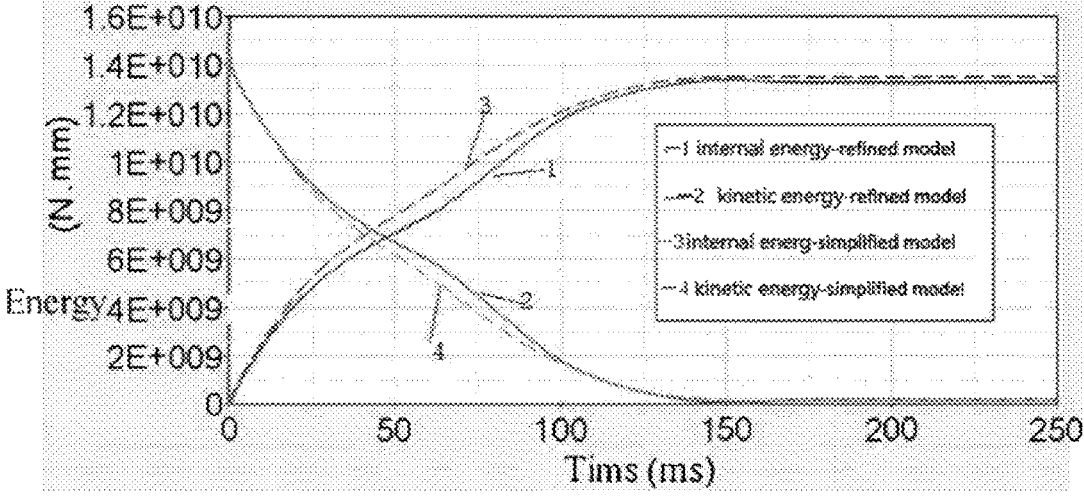
FIG. 19 is a comparison chart of collision energy curves between the detailed model and the optimal simplified model in an 80 km/h longitudinal rigid wall collision simulation.
Figure 20:
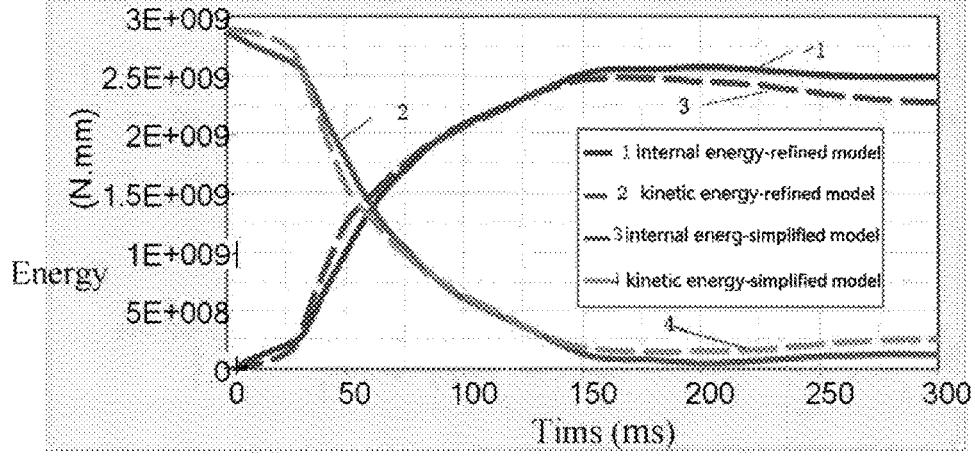
FIG. 20 is a comparison chart of collision energy curves between the detailed model and the optimal simplified model in a 36 km/h lateral rigid pole collision simulation.

Through the above method, the results of the established simplified rail vehicle models with different thickness reduction ratios are compared with those of the detailed rail vehicle model, as shown in FIGS. 9-14. In this embodiment, the optimal thickness reduction ratio for the simplified rail vehicle model, determined based on the total CORA value and vehicle collision deformation pattern, is 0.38. The comparison of the collision deformation patterns between the optimal simplified model and the detailed model is shown in FIGS. 15-17, and the comparison of the collision energy changes between the two models is shown in FIGS. 18-20. The results demonstrate that the optimal simplified rail vehicle model established through the above method aligns well with the numerical simulation results of the detailed model, indicating that the simplified model established by this method can accurately and effectively simulate the collision dynamic response in complex train accidents. Additionally, since this simplification method retains the interior space of the rail vehicle (such as sidewalls and other structures), the simplified model can also be directly used for research on secondary collision injuries to train occupants. Specifically, the simplified model can be directly utilized to establish a train-occupant coupled dynamic model to study the secondary collision dynamic response of occupants. Simultaneously, this method effectively reduces the number of meshes and nodes in the finite element collision simulation model of the rail vehicle (by 62% for meshes and 68% for nodes), significantly improving the computational efficiency of train collision simulations (by 55%). Table 1 provides a comparison of the model before and after simplification.

TABLE 1

| | Number of Meshes | Number of Nodes | Longitudinal Collision Simulation Time at 36 km/h/ 100 ms | Longitudinal Collision Simulation Time at 80 km/h/ 250 ms | Lateral Collision Simulation Time at 36 km/h/ 300 ms |
|---|---|---|---|---|---|
| detailed model | 508465 | 415228 | 4 h | 9.5 h | 11.2 h |
| Simplified Model | 312807 | 282426 | 1.8 h | 4.2 h | 5 h |
| Reduction Rate | 62% | 68% | 55% | 56% | 55% |

In summary, the simplified model of rail vehicles established using the above method can accurately simulate the vehicle collision dynamics response and occupant secondary collision injury response in complex train accidents, effectively reducing the number of meshes and nodes in the simulation model, and significantly improving the simulation calculation efficiency. It employs the CORA objective rating method to quantitatively assess the validity of the simplified model, ensuring that the collision performance of the simplified model is consistent or similar to that of the detailed model. Additionally, although this embodiment only simplifies the model of the intermediate car of the train, this method is equally applicable to simplifying the model of the head car of the train. The head car of the train is typically equipped with a multi-stage energy-absorbing structure, which can effectively absorb the impact kinetic energy of the train during longitudinal impacts, reducing the deformation of the head car body. Furthermore, similar to the intermediate car body, the head car body of the train also adopts a sandwich corrugated hollow double-shell structure. Therefore, the method proposed in the disclosure for constructing simplified models for rail vehicle collision simulations is applicable to all carriages of the train.

Embodiment 2

This embodiment provides a system based on the method for constructing the simplified rail vehicle model, which includes: a modeling module, a setting module, a collision simulation module, a CORA calculation module, and a screening module.

The modeling module is configured to construct detailed and simplified models of rail vehicles using finite element techniques based on their three-dimensional structures. The simplified model sets the middle section of each carriage body as a solid single-shell structure and the ends as hollow double-shell structures.

The setting module is configured to perform initial settings on the simplified model with reference to the detailed model, including setting materials, mechanical properties parameters, and mass points. It is also configured to further set different simplification thickness ratio to obtain several sets of simplified models.

The collision simulation module is configured to design longitudinal and lateral collision conditions, and perform collision simulations on the detailed model and each set of simplified models with different simplification thickness ratio under each collision condition to obtain their respective collision response curves.

The CORA calculation module calculates the total CORA value for each simplified model with a specific thickness ratio based on the collision response curves of the simplified and detailed models using the CORA evaluation method.

Specifically, the CORA value for each simplified model with a specific thickness ratio under each collision condition is calculated based on the collision response curves of the detailed model and the simplified models with different simplification thickness ratio under the same collision condition. Then, the CORA values under all collision conditions are weighted to obtain the total CORA value for each simplified model with a specific thickness ratio.

The screening module selects the optimal simplified model based on the total CORA value as the selection criterion, choosing from those with higher total CORA values.

For the specific implementation process of each module, please refer to the content of the above method, which will not be repeated here. It should be understood that the division of functional modules is merely a logical division, and there can be other division methods in actual implementation. For example, multiple units or components can be combined or integrated into another system, or some features can be ignored or not executed. At the same time, the integrated units can be implemented in the form of hardware or software functional units.

The readable storage medium is a computer-readable storage medium, which can be an internal storage unit of the controller described in any of the aforementioned embodiments, such as the hard disk or memory of the controller. For instance, in the present invention, the terrain feature model built is stored on the hard disk, while the computer program executing the fusion step is stored in the memory, enabling the fusion process to be realized through the memory. The readable storage medium can also be an external storage device of the controller, such as a plug-in hard disk, a Smart Media Card (SMC), a Secure Digital (SD) card, a flash card, etc., equipped on the controller. Furthermore, the readable storage medium can include both the internal storage unit and external storage devices of the controller. The readable storage medium is used to store the computer program as well as other programs and data required by the controller. The readable storage medium can also be used to temporarily store data that has been output or will be output.

Based on such understanding, the technical solution of the present invention, or the part that contributes to the prior art, or all or part of the technical solution, can be embodied in the form of a software product. This computer software product is stored in a storage medium and includes several instructions for causing a computer device (which can be a personal computer, server, or network device, etc.) to execute all or part of the steps of the method described in various embodiments of the present invention. The aforementioned readable storage medium includes various media capable of storing program code, such as USB flash drives, portable hard drives, Read-Only Memory (ROM), Random Access Memory (RAM), magnetic disks, or optical disks.

Embodiment 3

This embodiment further provides a method for simulating occupant secondary collisions based on the simplified model of rail vehicles, which includes the following steps:

S1: Construct a simplified model of the target rail vehicle according to the described construction method.

S2: Utilize the simplified model to simulate the actual interior decoration and occupant scenarios within the target rail vehicle, and perform collision simulations to obtain collision simulation results.

Embodiment 4

Figure 21:
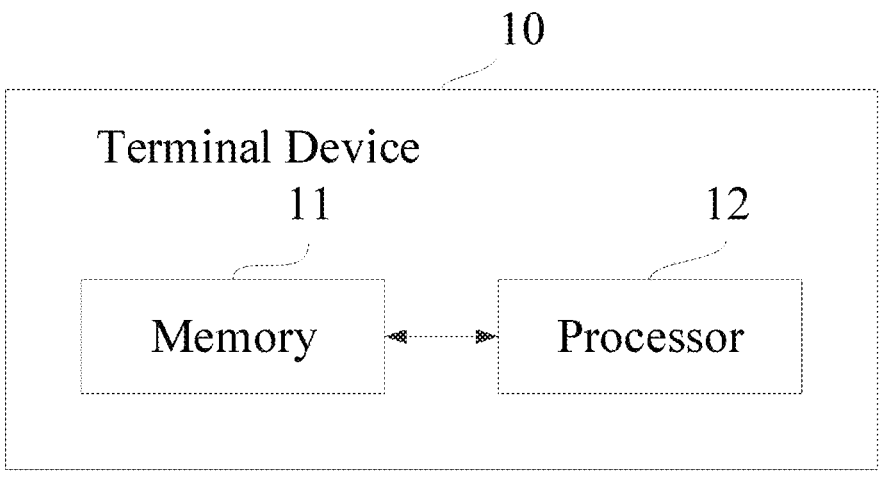
FIG. 21 is diagram of a terminal device in accordance with an embodiment.

Referring to FIG. 21, this embodiment provides a terminal device 100 including one or more processors 12 and a memory 11 storing one or more computer programs; wherein the processor 12 executes the corresponding computer programs to implement a method for constructing a simplified railway vehicle model or the steps of a method for simulating secondary occupant collisions based on a simplified railway vehicle model.

Specifically, the processor executes the corresponding computer programs to execute the following steps:

Step 1: constructing a detailed model and a simplified model of the rail vehicle using finite element method based on the three-dimensional structure of the rail vehicle. Step 2:

initially setting the simplified model in accordance with the detailed model, including specifying materials, mechanical properties parameters, and mass point. Step 3: setting different simplification thickness ratio to obtain a plurality of sets of the simplified models, designing longitudinal and lateral collision conditions, and in each type of the collision conditions, performing collision simulations on the detailed model and each set of the simplified models under each thickness ratio to obtain respective collision response curves. Step 4: using a CORA evaluation method to calculate a total CORA value corresponding to the plurality of sets of the simplified models that have different thickness ratio, based on the collision response curves of the simplified model and the detailed model in the same collision condition. Step 5: selecting an optimal simplified model from n sets of the simplified models with the highest total CORA values. Or, the computer programs are executed by the processor to execute the following steps:

S1: construct a simplified model of the target railway vehicle according to the construction method. S2: Use the simplified model to simulate the actual interior decoration and occupant scenarios within the target railway vehicle, and perform collision simulations to obtain collision simulation results.

It should be understood that the implementation process of some steps and whether and in what order some steps are executed can refer to the implementation process of Embodiment 1 described earlier.

The memory may contain high-speed RAM memory and may also include non-volatile memory, such as at least one disk memory.

If the memory and processor are implemented independently, then the memory, processor, and communication interface can be interconnected via a bus and complete communication among each other. The bus can be an Industry Standard Architecture (ISA) bus, a Peripheral Component Interconnect (PCI) bus, or an Extended Industry Standard Architecture (EISA) bus, etc. The bus can be divided into an address bus, a data bus, a control bus, etc.

Further, in specific implementations, if the memory 11 and processor 12 are integrated onto a single chip, then the memory 11 and processor 12 can complete communication between each other via an internal interface.

It should be understood that the simplified model retains the exterior shape of the vehicle body, laying a foundation for occupant secondary collision simulation experiments. The disclosure does not constrain how to conduct secondary collision research on occupants, as numerous related technologies already exist in the prior art to achieve this.

It should be understood that in the embodiments of the present invention, the processor referred to can be a Central Processing Unit (CPU). The processor can also be other types of processors such as a general-purpose processor, a Digital Signal Processor (DSP), an Application Specific Integrated Circuit (ASIC), a Field-Programmable Gate Array (FPGA) or other programmable logic devices, discrete gate or transistor logic devices, discrete hardware components, etc. The general-purpose processor can be a microprocessor, or any conventional processor, etc. The memory can include read-only memory and random access memory, and provides instructions and data to the processor. A portion of the memory can also include non-volatile random access memory. For example, the memory can also store information about device types.

It should be emphasized that the examples described in the disclosure are illustrative and not limiting. Therefore, the invention is not limited to the examples described in the specific embodiments. Any other embodiments derived by those skilled in the art based on the technical solutions of the disclosure, without departing from the purpose and scope of the invention, whether through modification or replacement, are also within the scope of protection of the disclosure.

The invention claimed is:

1. A method for constructing a simplified rail vehicle model, comprising:

constructing a detailed model and a simplified model of the rail vehicle using finite element method based on a physical three-dimensional structure of a real rail vehicle, the detailed model of the rail vehicle being a 1:1 scale reproduction vehicle model that replicates the real vehicle's structural details; and the simplified model of the rail vehicle retaining an external form of the real rail vehicle; wherein in the simplified model, a middle part of carriage body of the rail vehicle is configured as a solid single-shell structure, while two ends of the carriage body are configured as hollow double-shell structures;

initializing the simplified model in accordance with the detailed model, including specifying materials, mechanical properties parameters, and mass points;

in response to different simplification thickness ratios input by an input device, generating a plurality of sets of simplified models, each of which proportionally scaling the shell thickness of distinct vehicle body sections based on the corresponding simplification thickness ratio, such that each simplification thickness corresponds each simplified model; designing longitudinal and lateral collision conditions, and in each type of the collision conditions, performing collision simulations on the detailed model and each set of the simplified models under each thickness ratio to obtain respective collision response curves, wherein the thickness ratio is a ratio of the thickness of the solid single-shell of the simplified model to a thickness spacing of the hollow double-shell of the detailed model at a same position;

based on a CORA evaluation method to calculate a total CORA value corresponding to the plurality of sets of the simplified models that have different simplification thickness ratio, based on the collision response curves of the simplified model and the detailed model in a same collision condition, wherein based on a CORA evaluation method to calculate the total CORA value including: calculating CORA values for all the simplified model under the same collision condition based on the collision response curves of the detailed model and the plurality of sets of simplified models under the same collision condition that a dummy model can be directly placed into all the simplified models to conduct secondary collision simulation of train occupants; and performing weighted calculations on the CORA values under all collision conditions to obtain the total CORA value; when there are more than two collision response curves, the CORA value obtained for the simplified model under any of the simplification thickness ratio and for any of the collision conditions is a weighted average of the CORA values obtained for the simplified model under each type of the collision response curves for the corresponding collision condition;

based on the total CORA value, selecting an optimal simplified model from n sets of the simplified models with highest total CORA values, where a value range of n is 2 to 5.

2. The method for constructing the simplified rail vehicle model according to claim 1, wherein for the simplified model, when there are common nodes, mesh elements positioned between both ends of the hollow double-shell structure and a central section of the solid single-shell structure are connected through the common nodes; when there are no common nodes, free ends of the hollow double-shell structure are connected to the solid single-shell structure through rigid beam elements.

3. The method for constructing the simplified rail vehicle model according to claim 1, wherein the collision response curves further include one or more of a collision kinetic energy-time curve, an internal energy-time curve, and an acceleration-time curve.

4. The method for constructing the simplified rail vehicle model according to claim 1, wherein for one type of collision response curve, the CORA value for the simplified model, under any of the simplification thickness ratio in any of the collision conditions, is calculated according to a following formula:

$$C = w_1 C_1 + w_2 * C_2$$

$$C_2 = w_{2a} * C_{2a} + w_{2b} * C_{2b} + w_{2c} * C_{2c}$$

in the formula, C indicates the CORA value; $w_1$, $w_2$, $w_{2a}$, $w_{2b}$, and $w_{2c}$ are all weighting factors, where the sum of $w_1$ and $w_2$ equals 1, and the sum of $w_{2a}$, $w_{2b}$, and $w_{2c}$ also equals 1; $C_1$ indicates a channel correlation score, $C_2$ indicates a cross-correlation score, $C_{2a}$ indicates a phase difference score, $C_{2b}$ indicates a peak difference score, and $C_{2c}$ indicates a slope difference score.

5. The method for constructing the simplified rail vehicle model according to claim 1, wherein operations of selecting the optimal simplified model comprises:

based on the total CORA value of the simplified models with different simplification thickness ratio, selecting the simplified model with the highest similarity in collision deformation mode to the detailed model from the n simplified models with the highest total CORA values as the optimal simplified model.

6. The method for constructing the simplified rail vehicle model according to claim 4, wherein operations of obtaining the channel correlation score $C_1$ comprises:

generating an inner channel and an outer channel based on the collision response curves of the detailed model;

calculating the channel correlation score $C_1$ based on a positional relationship between the collision response curves of the simplified model and the two signal channels;

wherein when the collision response curve of the simplified model is within a boundary of the inner channel, the channel correlation score $C_1$ is 1;

when the collision response curve of the simplified model is outside an outer boundary of the outer channel, the channel correlation score $C_1$ is 0;

when the collision response curve of the simplified model is between the inner and outer channels, the channel correlation score $C_1$ is calculated according to the following formula:

$$C_i = \begin{cases} 1 & , \text{when} |y(t_1) - x(t_i)| < \delta_i(t) \\ \left( \dfrac{\delta_0(t) - |y(t_i) - x(t_i)|}{\delta_0(t) - \delta_i(t)} \right)^k & \\ 0 & , \text{when} |y(t_i) - x(t_i)| > \delta_i(t) \end{cases}$$

wherein, k>0 and k∈N $$C_1 = \frac{\sum_{i=1}^{n} C_i}{n}, 0 \le C_1 \le 1$$

wherein, $\delta_0(t)$ indicates the boundary of the outer channel, $\delta_i(t)$ indicates the boundary of the inner channel, $y(t_i)$ indicates a reference curve, which is the collision response curve of the detailed model; $x(t_i)$ indicates an evaluation curve, which is the collision response curve of the simplified model $C_i$ indicates the score at different time steps, where i indicates the ith time step, k is the exponential factor for the channel correlation score, and N indicates a real number.

7. The method for constructing the simplified rail vehicle model according to claim 6, wherein operations of obtaining the cross-correlation score $C_2$ comprise:

within an evaluation interval $[t_{min}, t_{max}]$, shifting the reference curve by changing multiples of the time step $\Delta t$, and calculating a cross-correlation value between the reference curve and the evaluation curve for each changed time step $\Delta t$; wherein the reference curve is the collision response curve of the detailed model, and the evaluation curve is the collision response curve of the simplified model;

at a time step of maximum cross-correlation, calculating the phase difference score $C_{2a}$, the slope difference score $C_{2c}$, and the peak difference score $C_{2b}$, between the reference curve and the evaluation curve.

8. A method for simulating occupant secondary collisions based on a simplified railway vehicle model, comprising:

constructing a detailed model and a simplified model of the rail vehicle using finite element method based on a physical three-dimensional structure of a real rail vehicle, the detailed model of the rail vehicle being a 1:1 scale reproduction vehicle model that replicates the real vehicle's structural details; and the simplified model of the rail vehicle retaining an external form of the real rail vehicle; wherein in the simplified model, a middle part of carriage body of the rail vehicle is configured as a solid single-shell structure, while two ends of the carriage body are configured as hollow double-shell structures, initializing the simplified model in accordance with the detailed model, including specifying materials, mechanical properties parameters, and mass points;

in response to different simplification thickness ratios input by an input device generating a plurality of sets of simplified models, each of which proportionally scaling the shell thickness of distinct vehicle body sections based on the corresponding simplification thickness ratio, such that each simplification thickness corresponds each simplified model; designing longitudinal and lateral collision conditions, and in each type of the collision conditions, performing collision simulations on the detailed model and each set of the simplified models under each thickness ratio to obtain respective collision response curves, wherein the thickness ratio is a ratio of the thickness of the solid single-shell of the simplified model to a thickness spacing of the hollow double-shell of the detailed model at a same position;

based on a CORA evaluation method to calculate a total CORA value corresponding to the plurality of sets of the simplified models that have different simplification thickness ratio, based on the collision response curves of the simplified model and the detailed model in a same collision condition, wherein based on a CORA evaluation method to calculate the total CORA value including: calculating CORA values for all the simplified model under the same collision condition based on the collision response curves of the detailed model and the plurality of sets of simplified models under the same collision condition that a dummy model can be directly placed into all the simplified models to conduct secondary collision simulation of train occupants; and performing weighted calculations on the CORA values under all collision conditions to obtain the total CORA value; when there are more than two collision response curves, the CORA value obtained for the simplified model under any of the simplification thickness ratio and for any of the collision conditions is a weighted average of the CORA values obtained for the simplified model under each type of the collision response curves for the corresponding collision condition;

based on the total CORA value, selecting an optimal simplified model from n sets of the simplified models with highest total CORA values, where a value range of n is 2 to 5;

using the simplified model of the target railway vehicle to simulate the actual interior decoration and occupant scenarios within the target railway vehicle, and performing collision simulations to obtain collision simulation results.

9. The method for simulating occupant secondary collisions according to claim 8, wherein for the simplified model, when there are common nodes, mesh elements positioned between both ends of the hollow double-shell structure and a central section of the solid single-shell structure are connected through the common nodes; when there are no common nodes, free ends of the hollow double-shell structure are connected to the solid single-shell structure through rigid beam elements.

10. The method for simulating occupant secondary collisions according to claim 8, wherein for one type of collision response curve, the CORA value for the simplified model, under any of the simplification thickness ratio in any of the collision conditions, is calculated according to the following:

$$C = w_1 C_1 + w_2 * C_2$$

$$C_2 = w_{2a} * C_{2a} + w_{2b} * C_{2b} + w_{2c} * C_{2c}$$

In the formula, C indicates the CORA value; $w_1$, $w_2$, $w_{2a}$, $w_{2b}$, and $w_{2c}$ are all weighting factors, where the sum of $w_1$ and $w_2$ equals 1, and the sum of $w_{2a}$, $w_{2b}$, and $w_{2c}$ also equals 1; $C_1$ indicates a channel correlation score, $C_2$ indicates a cross-correlation score, $C_{2a}$ indicates a phase difference score, $C_{2b}$ indicates a peak difference score, and $C_{2c}$ indicates a slope difference score.

11. The method for simulating occupant secondary collisions according to claim 8, wherein operations of selecting the optimal simplified model comprises:

based on the total CORA value of the simplified models with different simplification thickness ratio, selecting the simplified model with the highest similarity in collision deformation mode to the detailed model from the n simplified models with the highest total CORA values as the optimal simplified model.

12. The method for simulating occupant secondary collisions according to claim 9, wherein the collision response curves further include one or more of a collision kinetic energy-time curve, an internal energy-time curve, and an acceleration-time curve.

13. The method for simulating occupant secondary collisions according to claim 10, wherein operations of obtaining the channel correlation score $C_1$ comprises:

generating an inner channel and an outer channel based on the collision response curves of the detailed model;

calculating the channel correlation score $C_1$ based on a positional relationship between the collision response curves of the simplified model and the two signal channels;

wherein when the collision response curve of the simplified model is within a boundary of the inner channel, the channel correlation score $C_1$ is 1;

when the collision response curve of the simplified model is outside an outer boundary of the outer channel, the channel correlation score $C_1$ is 0;

when the collision response curve of the simplified model is between the inner and outer channels, the channel correlation score $C_1$ is calculated according to the following formula:

$$C_i = \begin{cases} 1 & , \text{when}|y(t_1) - x(t_i)| < \delta_i(t) \\ \left( \dfrac{\delta_0(t) - |y(t_i) - x(t_i)|}{\delta_0(t) - \delta_i(t)} \right)^k & \\ 0 & , \text{when}|y(t_i) - x(t_i)| > \delta_i(t) \end{cases}$$

wherein, k>0 and k∈N $$C_1 = \frac{\sum_{i=1}^n C_i}{n}, 0 \le C_1 \le 1$$

wherein, $\delta_0(t)$ indicates the boundary of the outer channel, $\delta_i(t)$ indicates the boundary of the inner channel, $y(t_i)$ indicates a reference curve, which is the collision response curve of the detailed model; $x(t_i)$ indicates an evaluation curve, which is the collision response curve of the simplified model; $C_i$ indicates the score at different time steps, where i indicates the ith time step, k is the exponential factor for the channel correlation score, and N indicates a real number.

14. The method for simulating occupant secondary collisions according to claim 13, wherein operations of obtaining the cross-correlation score $C_2$ comprise:

within an evaluation interval $[t_{min}, t_{max}]$, shifting the reference curve by changing multiples of the time step $\Delta t$, and calculating a cross-correlation value between the reference curve and the evaluation curve for each changed time step $\Delta t$; wherein the reference curve is the collision response curve of the detailed model, and the evaluation curve is the collision response curve of the simplified model;

at a time step of maximum cross-correlation, calculating the phase difference score $C_{2a}$, the slope difference score $C_{2c}$, and the peak difference score $C_{2b}$ between the reference curve and the evaluation curve.

15. A terminal device, comprising:

a memory, configured to store program instructions; and a processor, configured to performed the program instructions to perform a method for constructing a simplified rail vehicle model, the method for constructing the simplified rail vehicle model, comprising:

constructing a detailed model and a simplified model of the rail vehicle using finite element method based on a physical three-dimensional structure of a real rail vehicle, the detailed model of the rail vehicle being a 1:1 scale reproduction vehicle model that replicates the real vehicle's structural details; and the simplified model of the rail vehicle retaining an external form of the real rail vehicle; wherein in the simplified model, a middle part of carriage body of the rail vehicle is configured as a solid single-shell structure, while two ends of the carriage body are configured as hollow double-shell structures, initializing the simplified model in accordance with the detailed model, including specifying materials, mechanical properties parameters, and mass points;

in response to different simplification thickness ratios input by an input device generating a plurality of sets of simplified models, each of which proportionally scaling the shell thickness of distinct vehicle body sections based on the corresponding simplification thickness ratio, such that each simplification thickness corresponds each simplified model; designing longitudinal and lateral collision conditions, and in each type of the collision conditions, performing collision simulations on the detailed model and each set of the simplified models under each thickness ratio to obtain respective collision response curves, wherein the thickness ratio is a ratio of the thickness of the solid single-shell of the simplified model to a thickness spacing of the hollow double-shell of the detailed model at a same position;

based on a CORA evaluation method to calculate a total CORA value corresponding to the plurality of sets of the simplified models that have different simplification thickness ratio, based on the collision response curves of the simplified model and the detailed model in a same collision condition, wherein based on a CORA evaluation method to calculate the total CORA value including: calculating CORA values for all the simplified model under the same collision condition based on the collision response curves of the detailed model and the plurality of sets of simplified models under the same collision condition that a dummy model can be directly placed into all the simplified models to conduct secondary collision simulation of train occupants; and performing weighted calculations on the CORA values under all collision conditions to obtain the total CORA value; when there are more than two collision response curves, the CORA value obtained for the simplified model under any of the simplification thickness ratio and for any of the collision conditions is a weighted average of the CORA values obtained for the simplified model under each type of the collision response curves for the corresponding collision condition;

based on the total CORA value, selecting an optimal simplified model from n sets of the simplified models with highest total CORA values, where a value range of n is 2 to 5.

16. The terminal according to claim 15, wherein for the simplified model, when there are common nodes, mesh elements positioned between both ends of the hollow double-shell structure and a central section of the solid single-shell structure are connected through the common nodes; when there are no common nodes, free ends of the hollow double-shell structure are connected to the solid single-shell structure through rigid beam elements.

17. The terminal according to claim 15, wherein for one type of collision response curve, the CORA value for the simplified model, under any of the simplification thickness ratio in any of the collision conditions, is calculated according to the following:

$$C = w_1 C_1 + w_2 * C_2$$

$$C_2 = w_{2a} * C_{2a} + w_{2b} * C_{2b} + w_{2c} * C_{2c}$$

in the formula, C indicates the CORA value; $w_1$, $w_2$, $w_{2a}$, $w_{2b}$, and $w_{2c}$ are all weighting factors, where the sum of $w_1$ and $w_2$ equals 1, and the sum of $w_{2a}$, $w_{2b}$, and $w_{2c}$ also equals 1; $C_1$ indicates a channel correlation score, $C_2$ indicates a cross-correlation score, $C_{2a}$ indicates a phase difference score, $C_{2b}$ indicates a peak difference score, and $C_{2c}$ indicates a slope difference score.

18. The terminal according to claim 16, wherein the collision response curves further include one or more of a collision kinetic energy-time curve, an internal energy-time curve, and an acceleration-time curve.

19. The terminal according to claim 17, wherein operations of obtaining the channel correlation score $C_1$ comprise:

generating an inner channel and an outer channel based on the collision response curves of the detailed model;

calculating the channel correlation score $C_1$ based on a positional relationship between the collision response curves of the simplified model and the two signal channels;

wherein when the collision response curve of the simplified model is within a boundary of the inner channel, the channel correlation score $C_1$ is 1;

when the collision response curve of the simplified model is outside an outer boundary of the outer channel, the channel correlation score $C_1$ is 0;

when the collision response curve of the simplified model is between the inner and outer channels, the channel correlation score $C_1$ is calculated according to the following formula:

$$C_i = \begin{cases} 1 & , \text{when} |y(t_1) - x(t_i)| < \delta_i(t) \\ \left( \dfrac{\delta_0(t) - |y(t_i) - x(t_i)|}{\delta_0(t) - \delta_i(t)} \right)^k & \\ 0 & , \text{when} |y(t_i) - x(t_i)| > \delta_i(t) \end{cases}$$

Wherein, $k > 0$ and $k \in N$ $$C_1 = \frac{\sum_{i=1}^{n} C_i}{n}, 0 \le C_1 \le 1$$

Wherein, $\delta_0(t)$ indicates the boundary of the outer channel, $\delta_i(t)$ indicates the boundary of the inner channel, $y(t_i)$ indicates a reference curve, which is the collision response curve of the detailed model; $x(t_i)$ indicates an evaluation curve, which is the collision response curve of the simplified model; $C_i$ indicates the score at different time steps, where i indicates the ith time step, k is the exponential factor for the channel correlation score, and N indicates a real number.

20. The terminal according to claim 19, wherein operations of obtaining the cross-correlation score $C_2$ comprises:

within an evaluation interval $[t_{min}, t_{max}]$, shifting the reference curve by changing multiples of the time step $\Delta t$, and calculating a cross-correlation value between the reference curve and the evaluation curve for each changed time step $\Delta t$; wherein the reference curve is the collision response curve of the detailed model, and the evaluation curve is the collision response curve of the simplified model;

at a time step of maximum cross-correlation, calculating the phase difference score $C_{2a}$, the slope difference score $C_{2c}$, and the peak difference score $C_{2b}$ between the reference curve and the evaluation curve.

* * * * *